United States Patent [19]

Wilkinson

[11] Patent Number: 5,546,694
[45] Date of Patent: Aug. 20, 1996

[54] SIMULATED CRAB LURE

[76] Inventor: F. Charles Wilkinson, 1165 Old Wilmington Rd., Hockessin, Del. 19707

[21] Appl. No.: 419,705

[22] Filed: Apr. 11, 1995

[51] Int. Cl.⁶ ..................................................... A01K 85/00
[52] U.S. Cl. ....................... 43/42.39; 43/42.31; 43/42.47; 43/42.45
[58] Field of Search ............................... 43/42.47, 42.45, 43/42.39, 42.06, 42.31

[56] References Cited

U.S. PATENT DOCUMENTS

| D. 154,109 | 6/1949 | Espey | 43/42.45 |
|---|---|---|---|
| 1,813,722 | 7/1931 | Wright | 43/42.47 |
| 1,813,843 | 7/1931 | Flood | 43/42.47 |
| 2,783,577 | 3/1957 | Jennings | 43/42.28 |
| 3,753,310 | 8/1973 | Werner | 43/42.47 |
| 4,642,933 | 2/1987 | Brown | 43/44.9 |
| 4,739,576 | 4/1988 | Davis | 43/42.47 |
| 4,807,388 | 2/1989 | Cribb | 43/42.47 |
| 4,823,497 | 4/1989 | Pierce | 43/42.31 |
| 5,119,581 | 6/1992 | Rudolph | 43/42.47 |

Primary Examiner—Kurt Rowan

[57] ABSTRACT

A lure for attracting and engaging a fish. The inventive device includes a main body shaped so as to resemble a crab. A bill extends from a forward end of the body for hydrodynamically biasing the body in response to movement of the lure. A keel extends from a bottom of the body to maintain stability of the lure when in motion. A hook extends from a rear of the body for engaging a fish attracted to the lure. A weight can be positioned within the keel so as to cause the body to assume a predetermined orientation within water.

5 Claims, 3 Drawing Sheets

# SIMULATED CRAB LURE

BACKGROUND OF THE INVENTION

1. Field of the Invention

The present invention relates to fishing lures and more particularly pertains to an simulated crab lure for attracting and engaging a fish.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

While the prior art fishing lures fulfill their respective, particular objectives and requirements, the prior art does not disclose a simulated crab lure for attracting and engaging a fish which includes a main body shaped so as to resemble a crab, a bill extending from a forward end of body for hydrodynamically biasing the body in response to a movement of the lure, a keel extending from a bottom of the body to maintain stability of the lure when in motion, a hook extending from a rear of the body for engaging a fish, and a weight positioned within the keel to cause the body to assume a predetermined orientation within water.

In these respects, the simulated crab lure according to the present invention substantially departs from the conventional concepts and designs of the prior art, and in so doing provides an apparatus primarily developed for the purpose of attracting and engaging a fish.

SUMMARY OF THE INVENTION

In view of the foregoing disadvantages inherent in the known types of fishing lures now present in the prior art, the present invention provides a new simulated crab lure construction wherein the same can be utilized for capturing fish in combination with a fishing pole. As such, the general purpose of the present invention, which will be described subsequently in greater detail, is to provide a new simulated crab lure apparatus and method which has many of the advantages of the fishing lures mentioned heretofore and many novel features that result in a simulated crab lure which is not anticipated, rendered obvious, suggested, or even implied by any of the prior art fishing lures, either alone or in any combination thereof.

To attain this, the present invention generally comprises a lure for attracting and engaging a fish. The inventive device includes a main body shaped so as to resemble a crab. A bill extends from a forward end of the body for hydrodynamically biasing the body in response to movement of the lure. A keel extends from a bottom of the body to maintain stability of the lure when in motion. A hook extends from a rear of the body for engaging a fish attracted to the lure. A weight can be positioned within the keel so as to cause the body to assume a predetermined orientation within water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new simulated crab lure apparatus and method which has many of the advantages of the fishing lures mentioned heretofore and many novel features that result in a simulated crab lure which is not anticipated, rendered obvious, suggested, or even implied by any of the prior art fishing lures, either alone or in any combination thereof.

It is another object of the present invention to provide a new simulated crab lure which may be easily and efficiently manufactured and marketed.

It is a further object of the present invention to provide a new simulated crab lure which is of a durable and reliable construction.

An even further object of the present invention is to provide a new simulated crab lure which is susceptible of a low cost of manufacture with regard to both materials and labor, and which accordingly is then susceptible of low prices of sale to the consuming public, thereby making such simulated crab lures economically available to the buying public.

Still yet another object of the present invention is to provide a new simulated crab lure which provides in the apparatuses and methods of the prior art some of the advantages thereof, while simultaneously overcoming some of the disadvantages normally associated therewith.

Still another object of the present invention is to provide a new simulated crab lure for attracting and engaging a fish.

Yet another object of the present invention is to provide a new simulated crab lure which includes a main body shaped so as to resemble a crab, a bill extending from a forward end of body for hydrodynamically biasing the body in response to a movement of the lure, a keel extending from a bottom of the body to maintain stability of the lure when in motion, a hook extending from a rear of the body for engaging a fish, and a weight positioned within the keel to cause the body to assume a predetermined orientation within water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
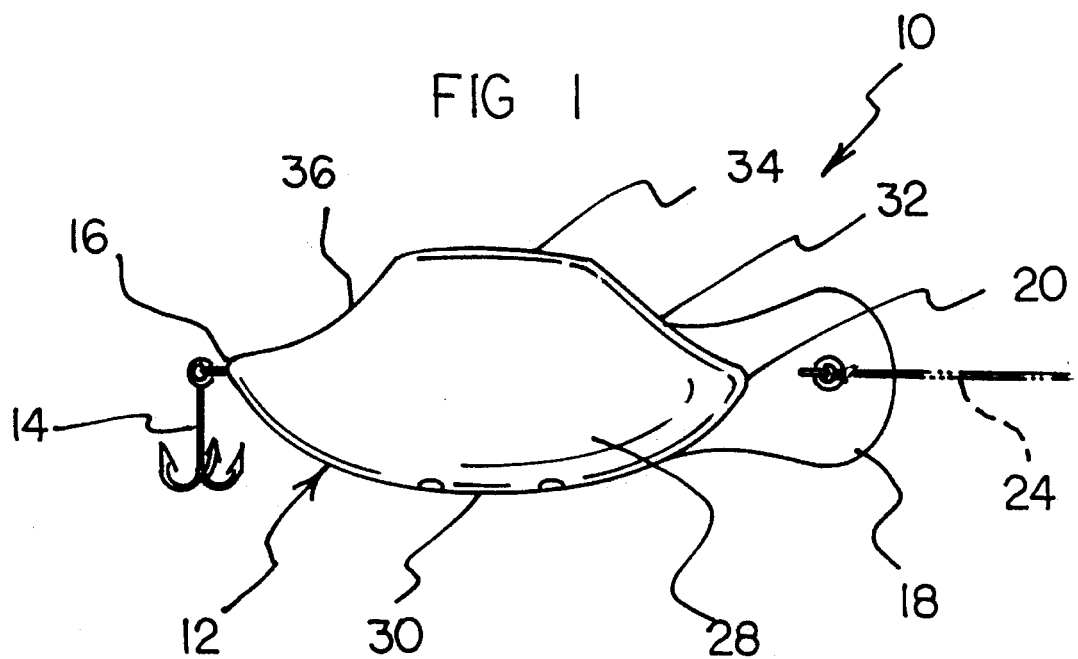
FIG. 1 is a top plan view of the present invention.

With reference now to the drawings, and in particular to FIGS. 1–6 thereof, a new simulated crab lure embodying the principles and concepts of the present invention and generally designated by the reference numeral 10 will be described.

More specifically, it will be noted that the simulated crab lure 10 comprises a crab body 12 shaped so as to substantially simulate or imitate an appearance of a crab. A hook 14 extends from a rearward end 16 of the crab body 12 for engaging a fish attracted to the lure 10. A bill 18 projects from a forward end 20 of the crab body 12 for hydrodynamically biasing the crab body in response to movement of the lure through a fluid such as water. A line anchor 22 is secured to the bill 18 proximal to a center thereof and permits attachment of a fishing line 24 to the lure 10. The crab body 12 is desirably formed of a substantially buoyant material and may include a weight 26 positioned therein which compensates for a weight of the hook 14 so as to substantially balance the crab body 12 about a transverse axis directed medially between the forward end 20 and the rearward end 16 of the lure 10.

Figure 2:
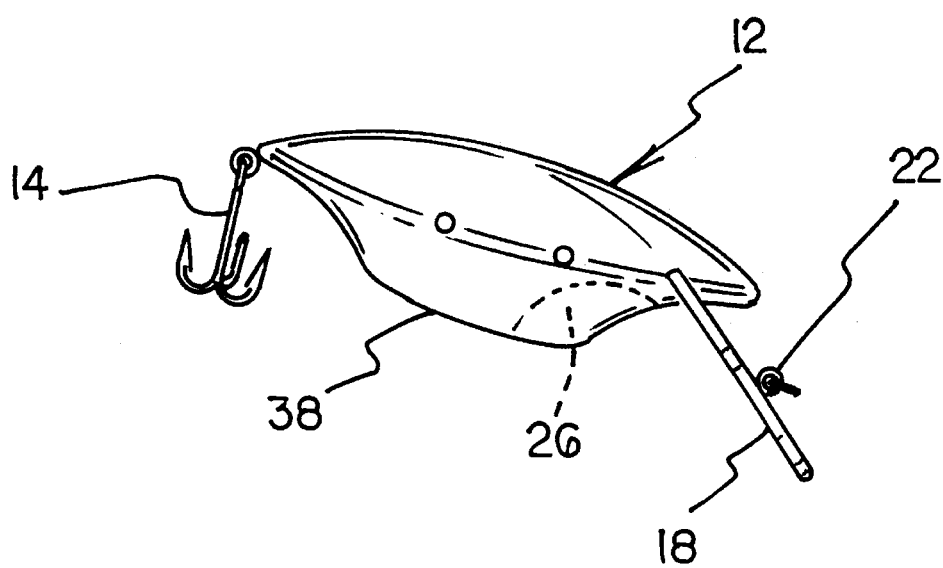
FIG. 2 is a side elevation view thereof.
Figure 3:
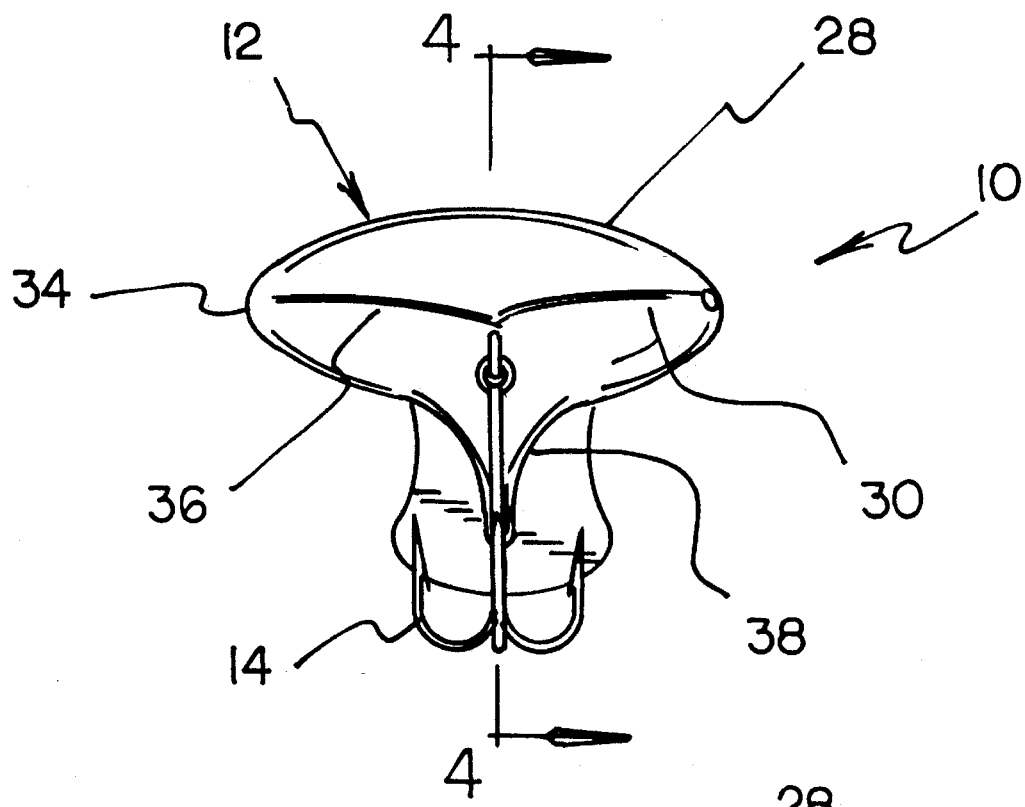
FIG. 3 is a rear elevation view of the present invention.
Figure 4:
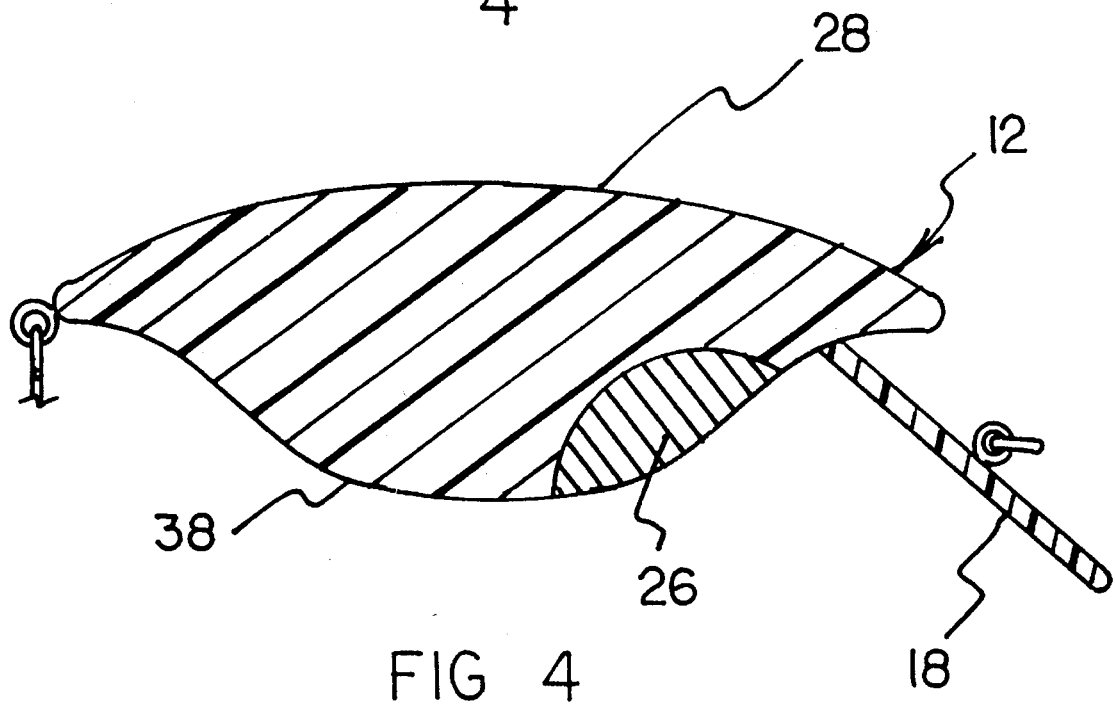
FIG. 4 is a cross sectional view taken along line 4—4 of FIG. 3.

As best illustrated in FIGS. 1 through 4, it can be shown that the crab body 12 according to the present invention 10 is shaped so as to define a domed upper surface 28 having an outer peripheral edge extending between the rearward end 16 and the forward end 20. The outer peripheral edge of the domed upper surface 28 is shaped so as to define an arcuate lateral edge 30 extending between the forward end 20 and the rearward end 16 along a first side of the crab body 12. The arcuate lateral edge 30 has an approximately constant radius of curvature and is therefor somewhat semi-circular in shape. In contrast, a periphery of the domed upper surface 28 along a second side of the crab body 12 is shaped to define an involute forward edge 32 integrally continuing into a straight lateral edge 34 which intersects an involute rear edge 36 terminating at the rearward end 16 of the crab body 12. Such configuration of the outer periphery of the domed upper surface 28 causes the crab body 12 to assume appearance of a crab so as to attract fish naturally attracted to such prey. As shown in FIG. 2, the crab body 12 further comprises a depending keel 38 extending below the domed upper surface 28 and into contiguous communication with the edges 30–36 thereof. The depending keel 38 extends downwardly from the domed upper surface 28 and may include the weight 26 therein as shown in FIG. 4. Preferably, the crab body 12 is comprised of a balsa or cedar wood material, but may also be comprised of any conventionally known material such as plastic or the like. The crab body 12 is preferably constructed of a substantially buoyant material which tends to rise in fluids such as water so as to attain the orientation illustrated in FIG. 2.

Figure 5:
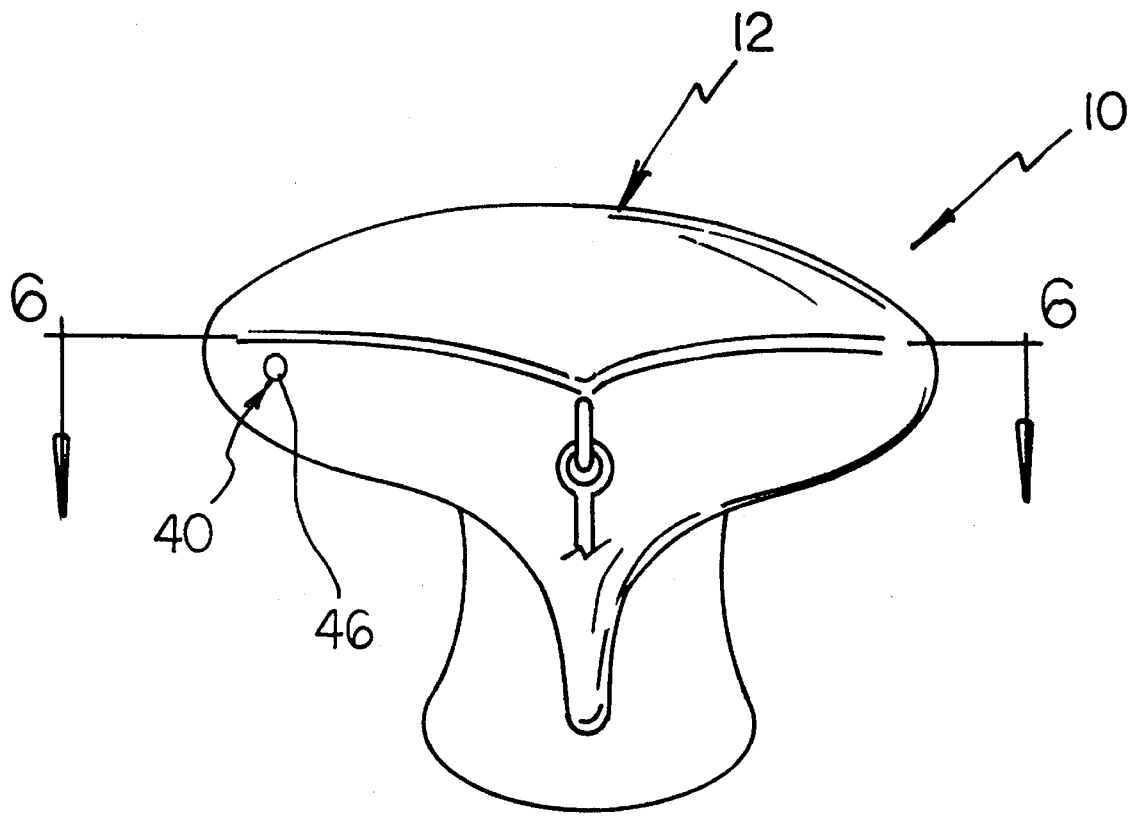
FIG. 5 is a rear elevation of the present invention including a dispensing means.
Figure 6:
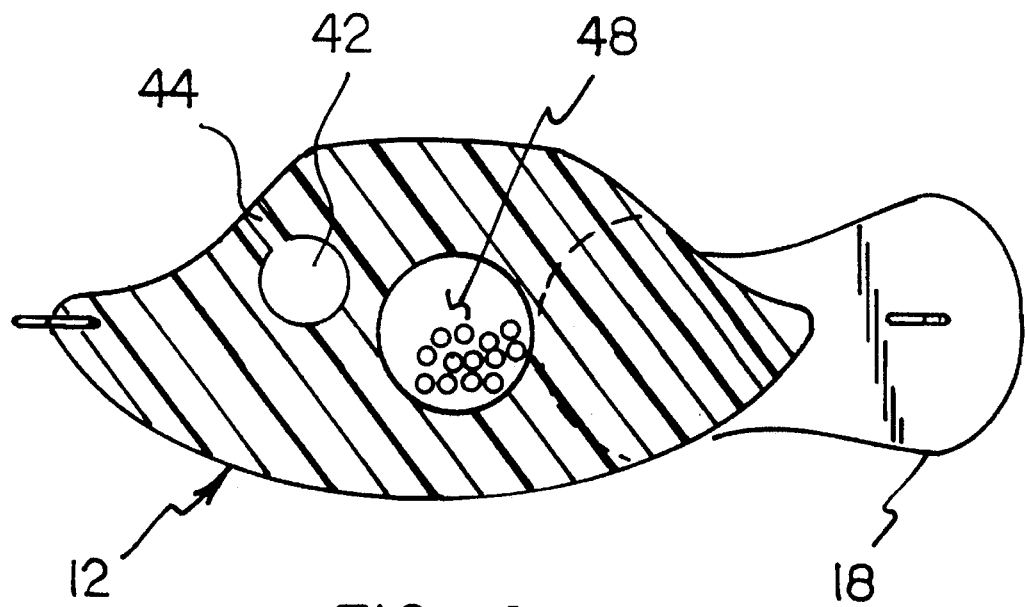
FIG. 6 is a cross sectional view taken along line 6—6 of FIG. 5.

As shown in FIGS. 5 and 6, the simulated crab lure 10 of the present invention may further comprise a dispensing means 40 for selectively dispensing a scented fluid from the crab body 12. To this end, the crab body 12 can be shaped so as to define a fluid reservoir 42 positioned therewithin which fluidly communicates through a fluid conduit 44 with a dispensing aperture 46. By this structure, a scented fluid commonly known in the art can be positioned within the fluid reservoir 42 through the dispensing aperture 46 and the fluid conduit 44, whereby an immersion of the lure 10 and a movement thereof through a body of water will result in dispensing of the scented fluid from the fluid reservoir 42 out the dispensing aperture 46 as a result of fluid passing over the crab body 12.

With continuing reference to FIG. 6, the crab body 12 of the lure 10 may be additionally shaped so as to define a rattle chamber 48 formed therewithin. A plurality of unlabeled rattle members such as steel balls or the like can be positioned within the rattle chamber 48 so as to create a sound during movement of the device 10 which simulates a sound of impacting claws against a shell of a natural crab. By this structure, a more realistic simulation of an actual crab is obtained.

In use, the simulated crab lure 10 according to the present invention can be easily utilized for attracting and capturing fish which normally feed on crabs. The present invention, when constructed with the dispensing means 40 within the crab body 12, can be further utilized to dispense a scented fluid so as to increase effectiveness of the device 10 in capturing fish attracted to such scented fluid.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A simulated crab lure comprising:

a crab body shaded so as to substantially simulate an appearance of a crab, said crab body being formed of a substantially buoyant material and including a weight positioned therein;

a hook extending from the crab body for engaging a fish attracted to the lure;

a bill projecting from a forward end of the crab body for hydrodynamically biasing the crab body in response to the movement of the lure through a fluid;

a line anchor secured to the bill and spaced from the crab body to permit attachment of a fishing line to the lure;

and further wherein the crab body includes a forward end spaced from a rearward end; and further wherein the crab body comprises a domed upper surface having an outer peripheral edge extending between the rearward end and the forward end, the outer peripheral edge of the domed upper surface being shaped so as to define an arcuate lateral edge extending between the forward end and the rearward end along a first side of the crab body, the arcuate lateral edge having an approximately constant radius of curvature and being substantially semi-circular in shape, the domed upper surface being further shaped so as to define an involute forward edge extending from the forward end of the crab body and integrally continuing into a straight lateral edge which intersects an involute rear edge terminating at the rearward end of the crab body along a second side thereof.

2. The simulated crab lure of claim 1, wherein the crab body further comprises a depending keel extending below the domed upper surface and into contiguous communication with the edges thereof, the depending keel extending downwardly from the domed upper surface.

3. The simulated crab lure of claim 2, and further comprising a dispensing means for selectively dispensing a scented fluid from the crab body.

4. The simulated crab lure of claim 3, wherein the crab body is shaped so as to define a fluid reservoir positioned therewithin; a fluid conduit positioned in fluid communication with the fluid reservoir; and a dispensing aperture positioned in fluid communication with the fluid conduit such that a scented fluid can be positioned within the fluid reservoir, whereby an immersion of the lure and a movement thereof through a body of water will result in dispensing of the scented fluid from the fluid reservoir out the dispensing aperture.

5. The simulated crab lure of claim 4, wherein the crab body is shaped so as to define a rattle chamber formed therewithin; and further comprising a plurality of rattle members positioned within the rattle chamber so as to create a sound during movement of the lure which simulates a sound of impacting claws against a shell of a natural crab.

* * * * *